United States Patent
Isola et al.

(10) Patent No.: US 10,277,602 B2
(45) Date of Patent: *Apr. 30, 2019

(54) DEVICE BLOCKING TOOL

(71) Applicant: BANK OF AMERICA CORPORATION, Charlotte, NC (US)

(72) Inventors: Rahul G. Isola, Charlotte, NC (US); Anthony P. Grossi, Glencoe, IL (US); Patrick M. Sweet, Albany, NY (US)

(73) Assignee: Bank of America Corporation, Charlotte, NC (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/161,427

(22) Filed: May 23, 2016

(65) Prior Publication Data

US 2017/0339153 A1 Nov. 23, 2017

(51) Int. Cl.
*H04L 29/06* (2006.01)
*H04W 84/12* (2009.01)
*H04W 88/12* (2009.01)

(52) U.S. Cl.
CPC ........ *H04L 63/101* (2013.01); *H04L 63/0876* (2013.01); *H04L 63/14* (2013.01); *H04W 84/12* (2013.01); *H04W 88/12* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 8,331,350 B2* | 12/2012 | Abe | ..................... | H04L 61/2015 370/352 |
| 8,873,431 B1* | 10/2014 | Perkinson | ............... | H04L 45/02 370/254 |
| 2002/0141352 A1* | 10/2002 | Fangman | ........... | H04L 29/06027 370/254 |
| 2006/0174342 A1* | 8/2006 | Zaheer | .................... | G06F 21/56 726/23 |
| 2008/0013481 A1* | 1/2008 | Simons | ................. | H04L 63/104 370/328 |
| 2011/0145273 A1* | 6/2011 | Kolathaya | ............... | H04L 63/08 707/769 |

OTHER PUBLICATIONS

U.S. Appl. No. 15/161,566, filed May 23, 2016, Rahul G. Isola.
U.S. Appl. No. 15/161,911, filed May 23, 2016, Rahul G. Isola.
U.S. Appl. No. 15/161,715, filed May 23, 2016, Rahul G. Isola.

* cited by examiner

*Primary Examiner* — Jason K Gee
*Assistant Examiner* — Angela R Holmes
(74) *Attorney, Agent, or Firm* — Baker Botts L.L.P.

(57) ABSTRACT

A wireless device blocking tool includes a user interface, a location engine, and a connection engine. The user interface receives at least one of a MAC address and an IP address of a device. The location engine communicates a query to an access control server, receives a response from the access control server, and determines, based on the response, whether the device connected to a network through a wireless connection or a wired connection. If the device connected through the wireless connection, the location engine determines a WLC through which the device connected and if the device connected through the wired connection, the location engine determines a switch through which the device connected. The connection engine connects to the determined WLC if the device connected through the wireless connection and connects to the determined switch if the device connected through the wired connection.

18 Claims, 5 Drawing Sheets

DEVICE BLOCKING TOOL

TECHNICAL FIELD

This disclosure relates generally to a tool for blocking devices from a network.

BACKGROUND

Network security should be maintained in order to prevent activity that can damage a network (e.g., intrusions data exfilteration/theft, insider threats, etc.). One step in ensuring network security is blocking undesirable devices, such as for example, devices that have exhibited malicious activity, unknown devices, non-compliant devices, and devices that are being used by malicious or rogue users.

SUMMARY OF THE DISCLOSURE

According to one embodiment, a wireless device blocking tool includes a user interface, a location engine, and a connection engine. The user interface receives at least one of a Media Access Control (MAC) address of a device and an Internet Protocol (IP) address of the device. The location engine communicates to an access control server at least one of the MAC address of the device and the IP address of the device. The location engine also receives a response from the access control server and determines, based on the response, whether the device connected to a network through a wireless connection or a wired connection. In response to a determination that the device connected to the network through the wireless connection, the location engine determines a wireless local area network controller (WLC) through which the device connected to the network and in response to a determination that the device connected to the network through the wired connection, the location engine determines a switch through which the device connected to the network. The connection engine connects to the determined WLC in response to the determination that the device connected to the network through the wireless connection and connects to the determined switch in response to the determination that the device connected to the network through the wired connection.

According to another embodiment, a method includes receiving at least one of a MAC address of a device and an IP address of the device and communicating to an access control server at least one of the MAC address of the device and the IP address of the device. The method also includes receiving a response from the access control server and determining, based on the response, whether the device connected to a network through a wireless connection or a wired connection. The method further includes in response to a determination that the device connected to the network through the wireless connection, determining a WLC through which the device connected to the network and in response to a determination that the device connected to the network through the wired connection, determining a switch through which the device connected to the network. The method also includes connecting to the determined WLC in response to the determination that the device connected to the network through the wireless connection and connecting to the determined switch in response to the determination that the device connected to the network through the wired connection.

According to another embodiment, a system includes an access control server, a WLC, a switch, and a wireless device blocking tool. The wireless device blocking tool receives at least one of a MAC address of a device and an IP address of the device and communicates to the access control server at least one of the MAC address of the device and the IP address of the device. The wireless device blocking tool receives a response from the access control server and determines, based on the response, whether the device connected to a network through a wireless connection or a wired connection. In response to a determination that the device connected to the network through the wireless connection, the wireless device blocking tool determines that the device connected to the network through the WLC and in response to a determination that the device connected to the network through the wired connection, wireless device blocking tool determines that the device connected to the network through the switch. The wireless device blocking tool also connects to the WLC in response to the determination that the device connected to the network through the wireless connection and connects to the switch in response to the determination that the device connected to the network through the wired connection.

Certain embodiments provide one or more technical advantages. For example, an embodiment improves the security of a network by ensuring that compromised devices are prevented from connecting to the network in the future. As another example, an embodiment improves the security of a network by ensuring that the connection point of a compromised device is properly identified. As yet another example, an embodiment improves network security by removing compromised devices that are connected to the network and by blocking these devices from subsequently reconnecting to the network. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Network security should be maintained in order to prevent activities that can damage the network. For example, when user credentials are stolen, hackers may access the network using the stolen credentials. Such access exposes the network to malware and theft. As another example, the network may be improperly accessed through social engineering attempts. When the social engineering attempts are successful, access to the network may be improperly granted. This again exposes the network to malware and/or theft. As another example, a malicious or rogue user may already be connected to the network and may be attempting to compromise the network from within (e.g., stealing data, opening connections to other malicious users, etc.).

One way that these activities occur is through compromised devices that connect to the network. For example, a computer infected by a virus and/or malware can infect other devices on the network when the computer connects to the network. As another example, an IP telephone connected to the network that has a phone number known by hackers may be a frequent target of social engineering attempts. As yet another example, unknown devices may be compromised devices that threaten the network and other devices on the network. As another example, a clean device that is being operated by a malicious or rogue user can pose a significant threat to the network. If these devices connect and/or stay connected to the network, then the network may be compromised.

Another way that these activities occur is through clean or compromised devices that are operated by malicious or rogue users. For example, a malicious user can connect a clean device to a network and then download viruses and/or malware over the network. As another example, the user can steal data stored over the network after connecting to the network. If these users are allowed to connect and reconnect to the network, then the network may be compromised.

As network technology improves, networks grow larger to include an increasing number of devices and access points. As a result, it becomes more challenging to timely locate and/or identify a compromised device on the network and to remove and/or block that device before the network is compromised. For example, it may be possible for a compromised device to connect to the network, compromise the network (e.g., through malicious activity), and disconnect from the network before the malicious activity is detected. As a result, the size of the network may result in the network being more easily compromised by devices.

Figure 1:
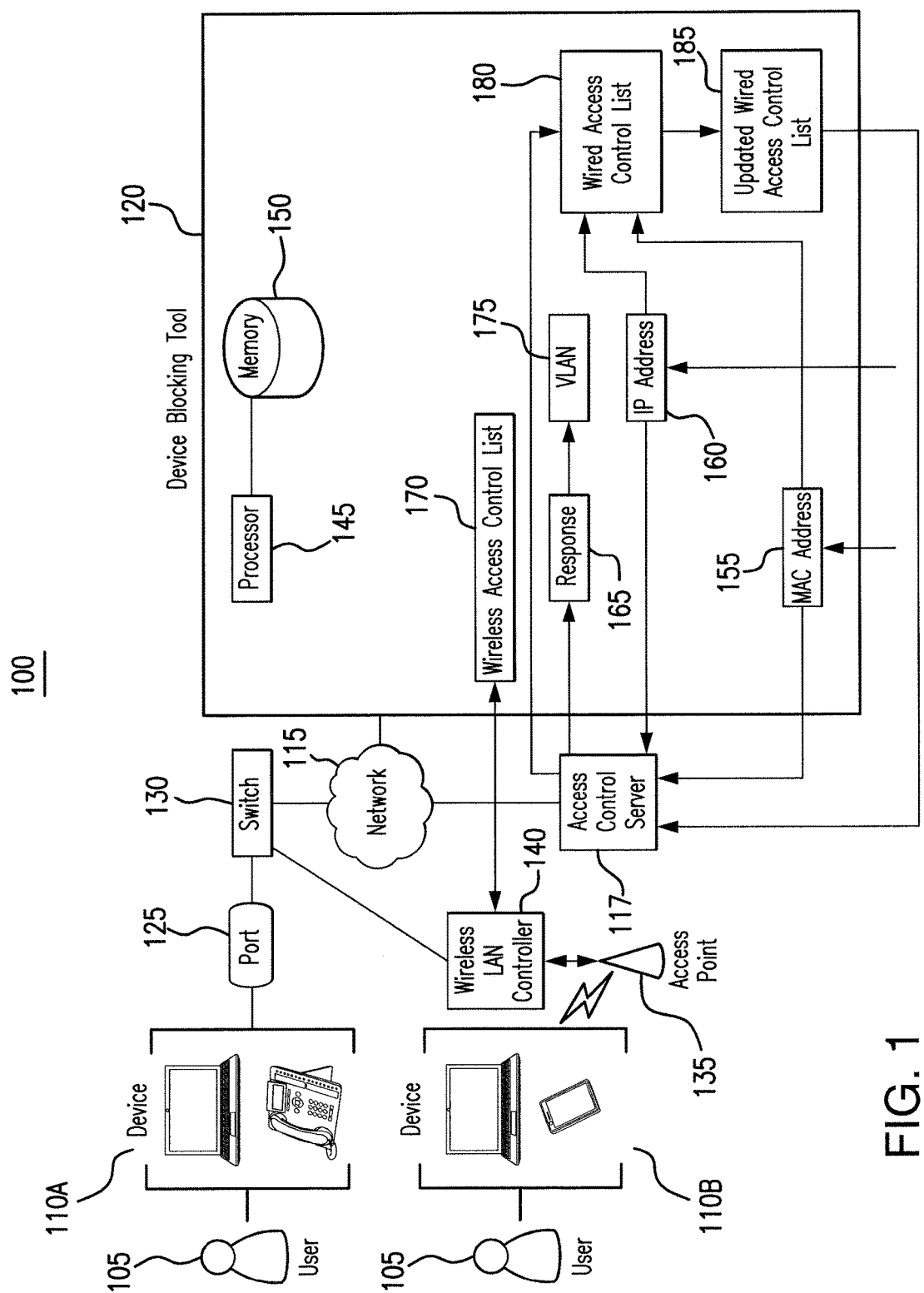
FIG. 1 illustrates a system for blocking a device.

This disclosure contemplates a device blocking tool that identifies and blocks compromised devices from connecting to a network. For example, the device blocking tool can identify a wireless device that connected to the network and update a wireless access control list of a wireless local area network (LAN) controller (WLC) through which the wireless device connected to the network to block that wireless device from subsequently connecting to the network. As another example, the device blocking tool can identify an Internet Protocol (IP) telephone connected to the network and update a wired access control list to block the IP phone and/or a port through which the IP phone connected to the network from subsequently connecting to the network. As a result, the device blocking tool can prevent both wired and wireless devices from subsequently connecting to the network. By keeping these devices off the network, the device blocking tool improves network security and minimizes the chances that the network will be compromised. Furthermore, the device blocking tool protects other devices on the network from being infected. The device blocking tool will be described in more detail using FIGS. 1 through 5. FIG. 1 will describe the device blocking tool generally. FIGS. 2 through 5 will describe the device blocking tool in more detail.

FIG. 1 illustrates a system for blocking a device. As illustrated in FIG. 1, system 100 includes users 105, devices 110A and 110B, a network 115, a device blocking tool 120, a port 125, a switch 130, an access point 135, a wireless LAN controller (WLC) 140 and an access control server 117. In particular embodiments, by using system 100, compromised devices are prevented from connecting to network 115 thereby improving network security. Furthermore, system 100 may improve network security by removing compromised devices that are connected to the network and by blocking these devices from subsequently reconnecting to the network.

Device 110 is any device capable of connecting to network 115. For example, device 110 may be a personal computer, a mobile phone, an internet protocol telephone and/or a laptop. This disclosure contemplates device(s) 110 being any appropriate device that can communicate over network 115. For example, device(s) 110 may be a computer, a laptop, a wireless or cellular telephone, an electronic notebook, a personal digital assistant, a tablet, a server, a mainframe, or any other device capable of receiving, processing, storing, and/or communicating information with other components of system 100. Device(s) 110 may also include a user interface, such as a display, a microphone, keypad, or other appropriate terminal equipment usable by a user. In some embodiments, an application executed by device(s) 110 may perform the functions described herein.

If device 110A or 110B is a compromised device (e.g., exhibits malicious activity), then device 110A or 110B could threaten the health of network 115 and/or other devices 110 connected to network 115. For example, if a personal computer is infected with a virus and/or malware when that computer connects to network 115, the virus and/or malware could spread to other devices connected to network 115. As another example, if an IP telephone connected to network 115 has a telephone number that is known to hackers and/or spammers, then that IP telephone could be a frequent target of social engineering attempts. The social engineering attempts could compromise the security of network 115 and/or the security of other devices connected to network 115. As yet another example, even if a computer is clean, it could still be operated by a malicious or rogue user that compromises the network. As a result, it is important to remove these devices from network 115 and to prevent them from subsequently connecting to network 115.

However, if network 115 is large and has several connection and/or access points through which numerous devices can connect to network 115, then it becomes difficult to identify the compromised device and to prevent that device from subsequently connecting to network 115. In some instances, it is challenging to simply identify the compromised device because of the amount of activity occurring over network 115. If the device is not identified, then it is not possible to remove and/or prevent that device from connecting to network 115. As another example, even if the device could be identified it could also be challenging to prevent that device from connecting to network 115. For example, if a compromised laptop connects through a wired connection, performs malicious activity, and then disconnects from network 115, that compromised laptop may still connect to network 115 in the future through a wireless access point. In particular embodiments, by using device blocking tool 120 it is possible to identify a compromised device and to block that device from subsequently connecting to network 115.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Access control server 117 controls access to network 115. For example, access control server 117 may store and maintain an access control list that indicates which devices are allowed to connect to network 115 and/or what devices are not allowed to connect to network 115. This access control list can be updated to change which devices may or may not connect to network 115.

When a device 110 attempts to connect to network 115, access control server 117 may receive a connection request from device 110. Access control server 117 may log the connection request. Access control server 117 may also log an identifier (e.g., name, media access control address, Internet Protocol address, etc.) for device 110, whether the connection request is accepted and/or denied, whether the connection is a wired or wireless connection, any activity that device 110 performs while connected to network 115, and when device 110 disconnects from network 115. Access control server 117 may store this log internally. An entry in the log for the device may be created when the device connects to network 115. The log may also indicate an access point through which device 110 connected to network 115. In particular embodiments, by consulting access control server 117, a compromised device 110 may be identified.

Port 125, switch 130, access point 135 and wireless LAN controller 140 are networking components through which device 110 may connect to network 115. As illustrated in FIG. 1, port 125 and wireless LAN controller 140 may be coupled to switch 130. Furthermore, access point 135 may be coupled to wireless LAN controller 140. Device 110 may connect to network 115 through a wired connection by connecting through port 125 and switch 130. Furthermore, device 110 may connect to network 115 through a wireless connection by connecting through access point 135, wireless LAN controller 140 and switch 130. In certain embodiments, device 110 may connect to network 115 through a wireless connection by connecting through access point 135 and wireless LAN controller 140.

Port 125 may be a communication endpoint for network 115. Port 125 may be a hardware port (e.g., a physical port, an Ethernet port, etc.) or a software port. Port 125 may identify a specific process or a type of service. Port 125 may be identified by a number referred to as a port number. Different port numbers may identify different services provided by the ports. System 100 may include any number of ports 125. By implementing additional ports 125, the number of services and connections supported by system 100 may be expanded.

Switch 130 is any appropriate communications equipment, including hardware and any appropriate controlling logic, for interconnecting elements and facilitating communications to and from endpoint devices. Switch 130 may include gateways, call managers, routers, hubs, switches, access points, base stations, cellular towers, radio networks, satellite telephone equipment implementing appropriate protocols for wireless telephony communications. It should be understood that various embodiments may operate using any number of switches 130. In addition, various embodiments may incorporate switches 130 in other wired or wireless networks coupled to the communications network 115 of system 100. System 100 may include any number of switches 130. By implementing additional switches 130, the number of connections to system 100 may be expanded.

Access point 135 is any networking hardware device (and accompanying software) that allows a device to connect to network 115. Access point 135 may include a router or any component thereof. Access point 135 may allow for both wireless connections and wired connections to network 115. For example, device 110 may connect wirelessly to access point 135 or connect to access point 135 via an Ethernet cable. System 100 may include any number of access points 135. By implementing more access points 135, the physical coverage area of network 115 can be expanded.

Wireless local area network (LAN) controller (WLC) 140 controls and manages access point 135. WLC 145 may be used to manage and control any number of access points 135 of system 100. WLC 140 may configure access points 135 to connect to network 115. In particular embodiments, WLC 140 may be used in combination with access points 135 to allow wireless connections to network 115. In some embodiments, WLC 140 may screen wireless connection attempts to network 115 and block connection attempts that are deemed compromised. For example, WLC 140 may maintain a wireless access control list 170 that identifies devices that should be prevented from connecting wirelessly to network 115. Wireless LAN controller 140 can connect to access point 135 and vice versa to allow for devices to connect to network 115 through access point 135 and wireless LAN controller 140.

Device blocking tool 120 identifies compromised devices 110 and blocks those devices 110 from subsequently connecting to network 115. As illustrated in FIG. 1, device blocking tool 120 includes a processor 145 and a memory 150. This disclosure contemplates processor 145 and memory 150 being configure to perform any of the tasks of device blocking tool 120 disclosed herein. In particular embodiments, by using device blocking tool 120, network security is improved because compromised devices are identified and prevented from subsequently connecting back to the network.

Processor 145 is any electronic circuitry, including, but not limited to microprocessors, application specific integrated circuits (ASIC), application specific instruction set processor (ASIP), and/or state machines, that communicatively couples to memory 150 and controls the operation of device blocking tool 120. Processor 145 may be 8-bit, 16-bit, 32-bit, 64-bit or of any other suitable architecture. Processor 145 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 145 may include other hardware and software that operates to control and process information. Processor 145 executes software stored on memory to perform any of the functions described herein. Processor 145 controls the operation and administration of device blocking tool 120 by processing information received from network 115, device(s) 110, and memory 150. Processor 145 may be a programmable logic device, a microcontroller, a microprocessor, any suitable processing device, or any suitable combination of the preceding. Processor 145 is not limited to a single processing device and may encompass multiple processing devices.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

Device blocking tool 120 may be used to identify and to block both wired and wireless devices from connecting to network 115. Device blocking tool 120 may first receive information that identifies a device, such as for example a media access control (MAC) address 155, an Internet Protocol (IP) address 160, a hostname, a username stored on the device, and/or any other appropriate identifying information. In particular embodiments, MAC address 155 and IP address 160 are provided by a user through a user interface of device blocking tool 120. For example, the user may have typed MAC address 155 and/or IP address 160 using a keyboard of device blocking tool 120. Device blocking tool 120 may use MAC address 155 and IP address 160 to identify a device and/or to block a device from network 115. Although this disclosure describes device blocking tool 120 using MAC address 155 and IP address 160 to identify and block a device, this disclosure contemplates device blocking tool 120 using any appropriate information to identify and to block a device.

Device blocking tool 120 communicates one or more of MAC address 155 and IP address 160 to access control server 117 to identify a device. Device blocking tool 120 may receive response 165 from access control server 117 in response to transmitting MAC address 155 and/or IP address 160 to access control server 117. Response 165 may indicate the identity and activities of a device with MAC address 155 and/or IP address 160. For example, if a device 110B connected to network 115 through access point 135, then response 165 may indicate that device 110B connected wirelessly to access point 135. As another example, if device 110A connected through port 125 to network 115, then response 165 may indicate that device 110A connected through a wired connection to network 115. Access control server 117 may generate response 165 based on information logged in access control server 117.

Based on response 165, device blocking tool 120 may determine whether the identified device connected to network 115 through a wireless connection or through a wired connection. Based on that determination, device blocking tool 120 may block the device differently. For a device that connected to network 115 through a wireless connection, that device can be blocked through wireless LAN controller 140. For a device that connected to network 115 through a wired connection, that device can be blocked through access control server 117.

If device blocking tool 120 determines that the device identified in response 165 connected to network 115 through a wireless connection, device blocking tool 120 may proceed to determine whether that device should be blocked. In particular embodiments, device blocking tool 120 may present information in response 165 to a user. The information may indicate the activities of the identified device. The user may then determine whether that activity is malicious or not. The user can then decide whether the device should be blocked and notify device blocking tool 120 of that decision. If the device should be blocked, device blocking tool 120 may connect to wireless LAN controller 140 and retrieve wireless access control list 170 from wireless LAN controller 140. Device blocking tool 120 may then update wireless access control list 170 by adding one or more of MAC address 155 and IP address 160 to wireless access control list 170. Then, device blocking tool 120 may send the updated wireless access control list 170 back to wireless LAN controller 140. In this manner, device blocking tool 120 may indicate to wireless LAN controller 140 that the device associated with MAC address 155 and IP address 160 should be blocked from connecting wirelessly to network 115. As a result, wireless LAN controller 140 will block subsequent attempts by the device to connect through an access point 135 of wireless LAN controller 140. In this manner, device blocking tool 120 may prevent the compromised device from connecting wirelessly to network 115 through any access point 135.

If response 165 indicates that the device connected through a wired connection to network 115, device blocking tool 120 may then determine a type for the device. For example, device blocking tool 120 may determine whether the device is a personal computer or an IP telephone. Device blocking tool 120 may make this determination using a virtual local area network (VLAN) type indicated by response 165. Response 165 may indicate a VLAN 175 through which the device connected to network 115. VLAN 175 may be associated with a number that identifies the VLAN. VLAN 175 may also be associated with a type that indicates the type of the device. For example, VLAN 175 type may be an "access type" that indicates that the device is a personal computer. As another example, VLAN 175 may be a "voice type" that indicates that the device is a telephone (e.g., an IP telephone). Based on the VLAN 175 type, device blocking tool 120 can determine whether the device is a personal computer or an IP phone. In particular embodiments, response 165 also indicates port 125 through which the device connected to network 115. Device blocking tool 120 presents this information, including VLAN 175 and port 125, to a user. The user can then decide whether the device should be blocked from subsequently connecting to network 115.

Device blocking tool 120 may present various options for blocking the device. For example, device blocking tool 120 may present an option to block all connections through the identified port 125. As another example, device blocking tool 120 may present an option to block the VLAN 175 through which the device connected to network 115. In this manner, device blocking tool 120 may allow for a device-specific blocking, a port-specific blocking, and/or a VLAN 175 specific blocking. If port 125 is blocked, then any device and/or service that attempts to connect through port 125 will be blocked. In this manner, device blocking tool 120 can block devices and/or services. Device blocking tool 120 may implement a specific type of blocking (e.g., voice block and/or access block) based on the type of VLAN 175 (voice or access) to block a specific type of device that connects through VLAN 175 such as, for example, an IP telephone or a personal computer.

Device blocking tool 120 may block VLAN 175 and/or port 125 by retrieving a wired access control list 180 from access control server 117. Then, device blocking tool 120 may add one or more of MAC address 155, IP address 160, port 125, and/or VLAN 175 to wired access control list 180 to produce an updated wired access control list 185. Device blocking tool 120 may then communicate updated wired access control list 185 to access control server 117. As a result, access control server 117 may prevent connections through port 125 and/or VLAN 175 and/or connections from the blocked device. In this manner, device blocking tool 120 may block compromised devices from connecting to network 115 through a wired connection.

If a blocked device attempts to connect to network 115, an alert will be communicated to the device, device blocking tool 120, and/or an administrator of network 115 indicating that the blocked device is attempting to connect to network 115. Appropriate response can then be taken to identify and stop the user of the device. Device blocking tool 120 will be discussed in more detail using FIGS. 2 through 5.

Figure 2:
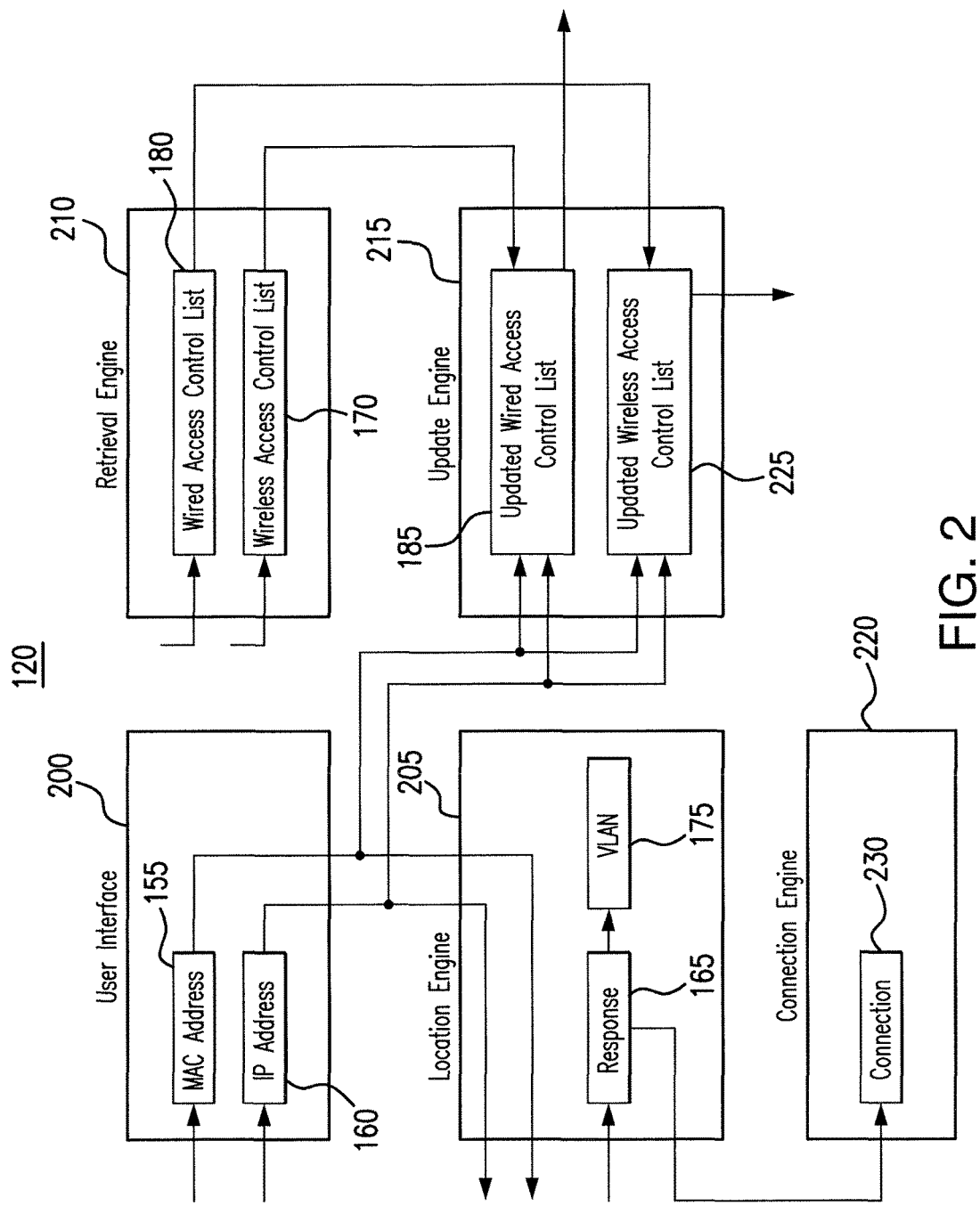
FIG. 2 illustrates the device blocking tool of the system of FIG. 1.

FIG. 2 illustrates the device blocking tool 120 of the system 100 of FIG. 1. As illustrated in FIG. 2, device blocking tool 120 includes a user interface 200, a location engine 205, a retrieval engine 210, an update engine 215 and a connection engine 220. In particular embodiments, by using device blocking tool 120 network security is improved because compromised devices are blocked from subsequently connecting to network 115.

Device blocking tool 120 may receive input through user interface 200. For example, user interface 200 may receive MAC address 155 and/or IP address 160. In certain embodiments, a user may input MAC address 155 and/or IP address 160 into user interface 200 through an input device such as, for example, a keyboard or a mouse. One example algorithm that user interface 200 follows is: wait for input from an input device; receive, input from the input device; and communicate the input to other components of device blocking tool 120. The input may be MAC address 155 and/or IP address 160. This disclosure contemplates user interface 200 receiving any type of information that identifies a device. For example, user interface 200 may receive a hostname of a device or a username stored on the device.

Location engine 205 may receive MAC address 155 and/or IP address 160 from user interface 200. Location engine 205 may then communicate MAC address 155 and/or IP address 160 to an access control server. An example algorithm for location engine 205 is: waiting for information from user interface 200; receiving information from user interface 200; and sending the information to the access control server. The information may include MAC address 155 and/or IP address 160. Location engine 205 may communicate any information that identifies a device to the access control server, such as for example, a hostname of a device or a username stored on the device.

Location engine 205 may receive response 165 from the access control server. Response 165 may be generated and/or communicated in response to receiving MAC address 155 and/or IP address 165. An example algorithm for location engine 205 is: sending information to the access control server; waiting for response 165 from the access control server; and receiving response 165 from the access control server.

Location engine 205 may determine based on response 165 whether a device identified by MAC address 155 and/or IP address 160 connected to a network through a wired connection or through a wireless connection. For example, information in response 165 may indicate the location of a connection through which the device connected to the network. Response 165 may also indicate whether that location is a wireless access point or a wired access point. Based on this information, location engine 205 may determine whether the device connected through the wireless connection or the wired connection. An example algorithm for location engine 205 is: receive response 165 from the access control server; examine response 165 to see whether response 165 indicates that a device connected through a wireless connection or through a wired connection; and determine, based on that information, whether the device connected through the wired connection or through the wireless connection.

If location engine 205 determines that the device connected through a wireless connection, location engine 205 may then determine a wireless LAN controller through which the device connected to the network. Response 165 may include information that identifies the wireless LAN controller through which the device connected to the network. Location engine 205 may use that information to determine the wireless LAN controller through which the device connected to the network. An example algorithm for location engine 205 is: determine based on response 165 that a device connected through a wireless connection; analyze response 165 to determine a wireless LAN controller through which the device connected to the network; and use the information in response 165 to determine the wireless LAN controller through which the device connected to the network.

If location engine 205 determines that the device connected through a wired connection, location engine 205 may determine a switch through which the device connected to the network. Response 165 may indicate the switch through which the device connected to the network. Location engine 205 may use that information in response 165 to determine the switch through which the device connected to the network. An example algorithm for location engine 205 is: determine based on information in response 165 that the device connected through the wired connection; analyze response 165 to see if response 165 identifies a switch through which the device connected to the network; determine that response 165 identifies the switch; and use that information to determine the switch through which the device connected to the network.

Location engine 205 may also determine a VLAN 175 based on information in response 165. VLAN 175 may be the VLAN through which the device connected to the network if the device connected through the wired connection. Response 165 may indicate a number identifying VLAN 175. Location engine 205 may use that number to identify VLAN 175. An example algorithm for location engine 205 is: determine that the device connected through the wired connection; analyze response 165 to see if response 165 includes a number that identifies a VLAN; and use that number to identify the VLAN.

Location engine 205 may use VLAN 175 to determine a type of the device. For example, location engine 205 may use VLAN 175 to determine whether the device is an IP telephone or a personal computer. Location engine 205 may store a table that maps VLANs to device types. Location engine 205 may consult that table to determine whether the device is an IP telephone or a personal computer. An example algorithm for location engine 205 is: determine a number that identifies VLAN 175; find the number in a column of a table; find a device type corresponding to that number in the table; and determine based on that device type that the device is an IP telephone or a personal computer.

Connection engine 220 may connect device blocking tool 120 to a component of system 100. For example, connection engine 220 may open a connection 230 to a wireless LAN controller through which a device connected to the network if the device connected through a wireless connection. As another example, connection engine 220 may open connection 230 to a switch through which a device connected to the network if the device connected through a wired connection. An example algorithm for location engine 205 is: wait for information from location engine 205; receive information from location engine 205; determine from that information that a device connected through a wireless connection; connect to a wireless LAN controller through which the device connected to the network based on that information; determine based on that information that another device connected through a wired connection; and connect to a switch identified in that information through which the device connected. In each of these examples, connection engine 220 connects to a component of system 100 by opening connection 230 with that component.

Retrieval engine 210 may retrieve wireless access control list 170 and wired access control list 180 from various components of system 100. For example, retrieval engine 210 may retrieve wireless access control list 170 from a wireless LAN controller. As another example, retrieval engine 210 may retrieve wired access control list 180 from an access control server. Retrieval engine 210 may retrieve one or more of wireless access control list 170 and wired access control list 180 based on determinations of whether a device connected through a wireless connection or a wired connection. For example, if location engine 205 determines that a device connected through a wireless connection, then retrieval engine 210 may retrieve wireless access control list 170 from a wireless LAN controller through which the device connected to the network. As another example, if location engine 205 determines that a device connected though a wired connection, then retrieval engine 210 may retrieve wired access control list 180 from an access control server. An example algorithm for retrieval engine 210 is: wait for information from location engine 210; receive information from location engine 210 indicating whether a device connected through a wireless connection or a wired connection; determine from the information that the device connected through a wireless connection; in response to that determination, request wireless access control list 170 from a wireless LAN controller; receive wireless access control list 170 from the wireless LAN controller; determine from the information that a device connected through a wired connection; in response to that determination, request wired access control list 180 from an access control server; receive wired access control list 180 from the access control server.

Update engine 215 may update wireless access control list 170 and wired access control list 180 to block devices from subsequently connecting to a network. For example, update engine 215 may add MAC address 155 and/or IP address 160 to wireless access control list 170 and/or wired access control list 180 to produce updated wireless access control list 225 and updated wired access control list 185 respectively. Update engine 215 may then communicate updated wireless access control list 225 to a wireless LAN controller and updated access control list 185 to an access control server to prevent devices from connecting through a wireless connection and a wired connection respectively. An example algorithm for update engine 215 is as follows: receive a MAC address and an IP address from user interface 200; receive a wireless access control list; add one or more of the MAC address and the IP address to the wireless access control list to produce an updated wireless access control list; send the updated wireless access control list to a wireless LAN controller; receive a wired access control list from retrieval engine 210; add one or more of the MAC address and the IP address to the wired address control list to produce an updated wired access control list; and send the wired access control to an access control server.

In particular embodiments, update engine 215 disassociates the VLAN. For example, update engine 215 may take the VLAN offline, delete the VLAN, disconnect the device from the VLAN, and/or prevent further connections to the VLAN. Then, update engine 215 moves the device to a blackholed VLAN. For example, update engine 215 may reassign a connection of the device to a VLAN that is not operational and/or a VLAN that does not provide services to the device, but rather monitors the device.

In particular embodiments, retrieval engine 210 may retrieve a port and a VLAN from a switch. For example, a device may have connected to a network through a particular port or VLAN. Retrieval engine 210 may retrieve from the switch the port and/or VLAN through which the device connected to the network. As a result, retrieval engine 210 may connect to the switch, request the port or VLAN, and receive the port or VLAN in response.

In some embodiments, retrieval engine 210 may retrieve from a wireless LAN controller an identification of a wireless access point through which a device connected to a network. For example, retrieval engine 210 may connect to the wireless LAN controller, request a wireless access point through which a device connected to a network, and receive information that identifies the wireless access point. Furthermore, retrieval engine may retrieve from the wireless LAN controller an identification of another device that connected to the network through the wireless LAN controller. For example, retrieval engine 210 may connect to the wireless LAN controller, request a list of devices that connected to the network through the wireless LAN controller, and receive that list identifying the devices.

Figure 3:
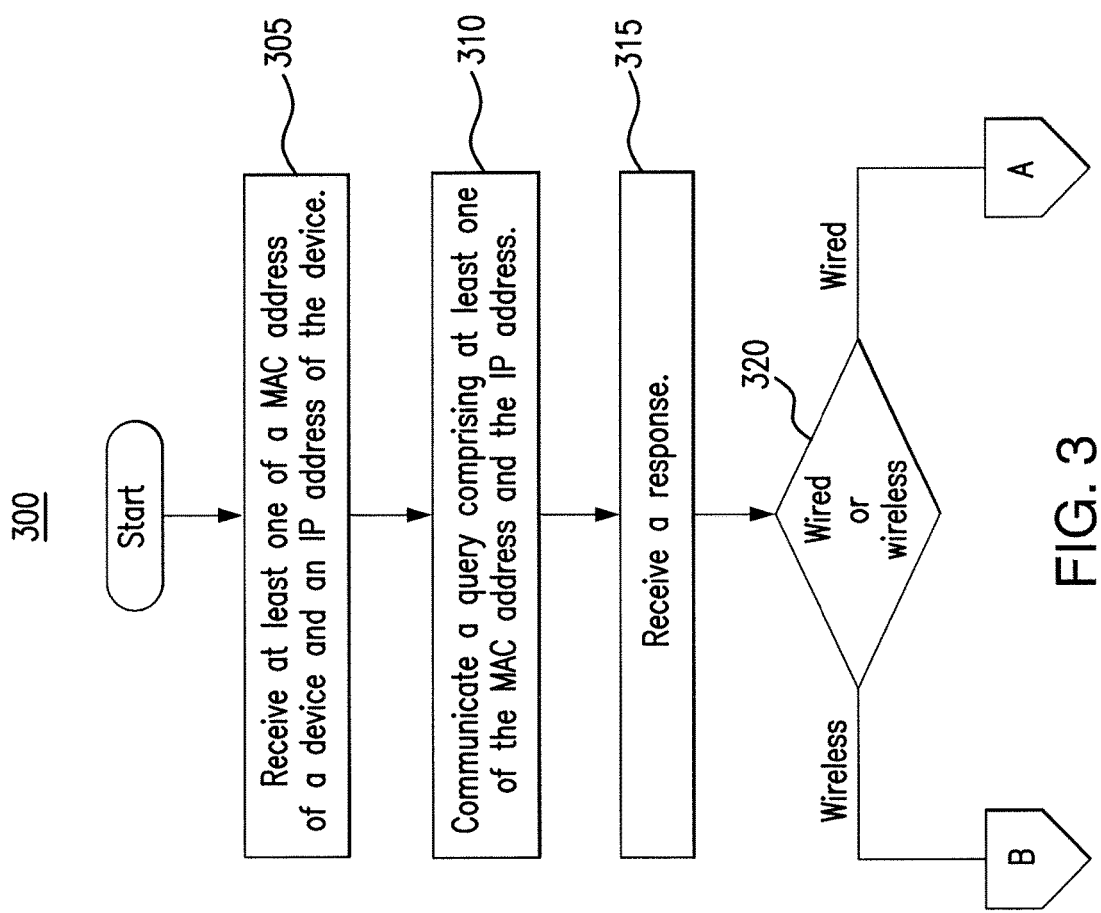
FIGS. 3 through 5 are flowcharts illustrating a method for blocking a device using the system of FIG. 1.
Figure 4:
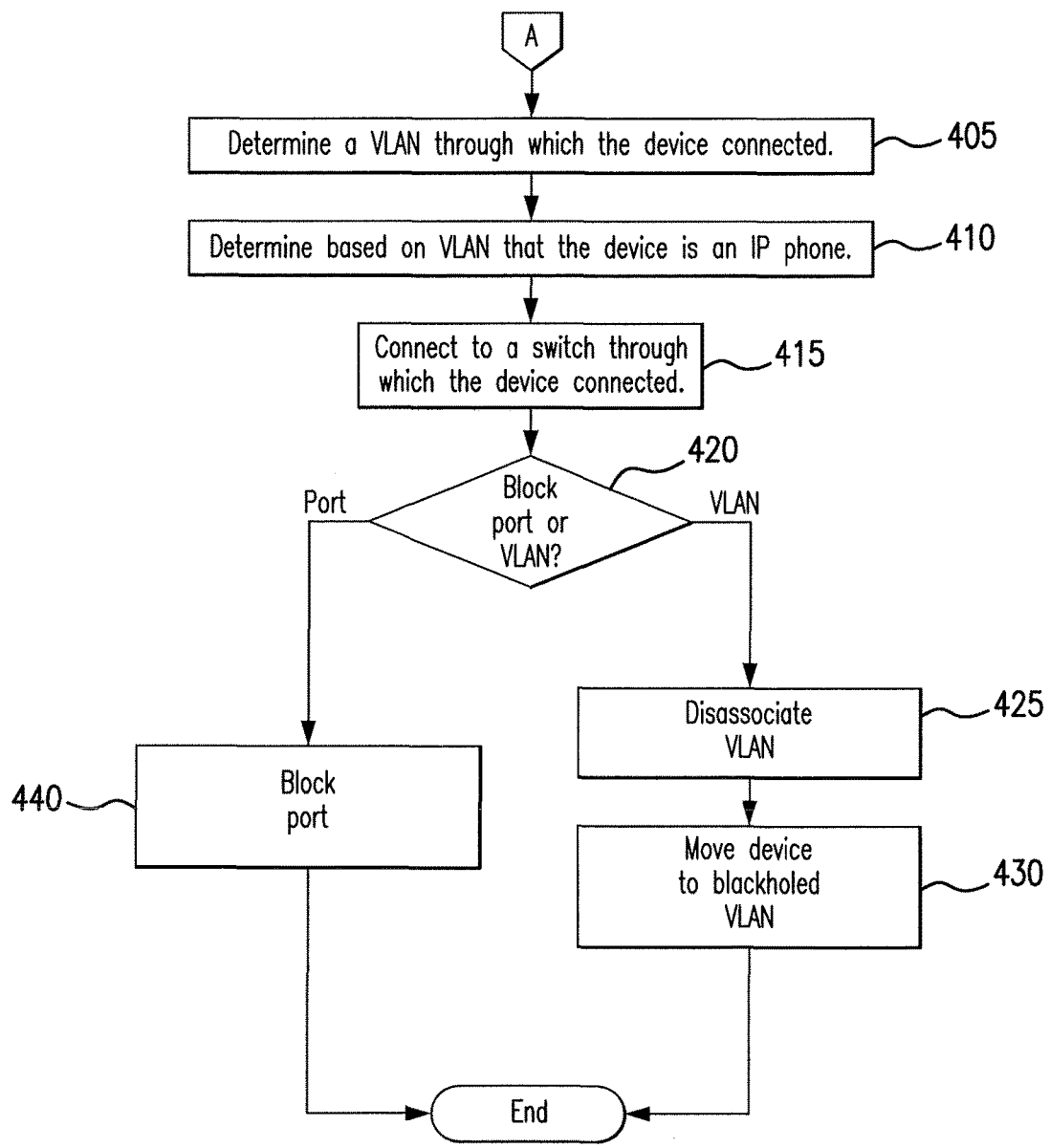
Figure 5:
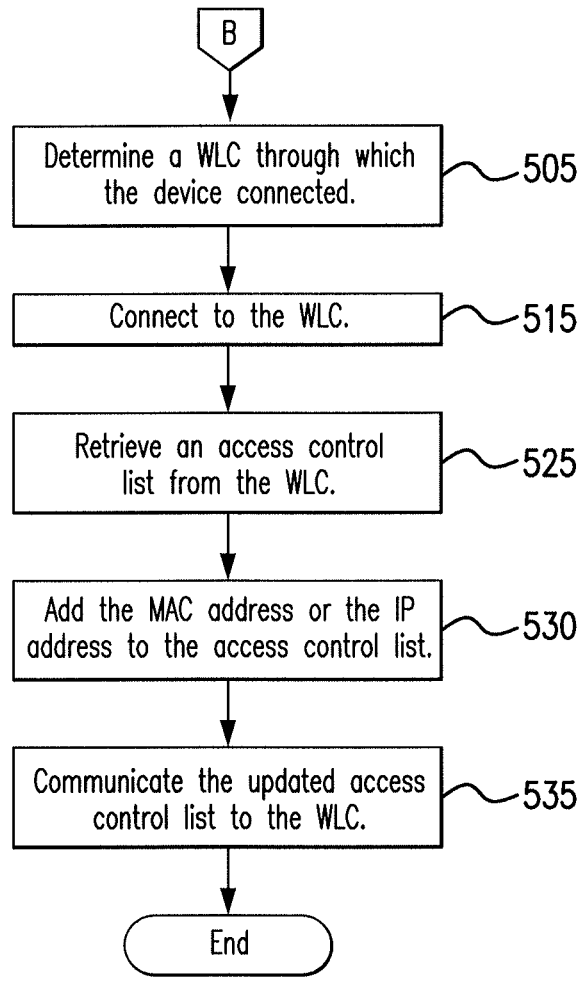

FIGS. 3 through 5 are flowcharts illustrating a method 300 for blocking a device using the system 100 of FIG. 1. In particular embodiments, device blocking tool 120 may perform method 300. By performing method 300, device blocking tool 120 may improve the security of a network by preventing compromised devices from subsequently connecting to the network.

Device blocking tool 120 may begin by receiving at least one of a MAC address of a device and an IP address of the device in step 305. Device blocking tool 120 communicates a query comprising at least one of the MAC address and the IP address in step 310. In particular embodiments, device blocking tool 120 may communicate the query to an access control server. Device blocking tool 120 may then receive a response in step 315. In some embodiments, device blocking tool 120 may receive the response from the access control server in response to communicating the query. Based on information in the response, device blocking tool 120 may determine whether the device connected through a wired connection or a wireless connection in step 320. Depending on whether the device connected through a wired or a wireless connection, device blocking tool 120 may attempt to block the device in a particular manner. If the device connected through a wired connection, device blocking tool 120 may proceed to the process described in FIG. 4. Device blocking tool 120 may determine a VLAN and/or a switch through which the device connected in step 405. The VLAN may be identified by a number. The VLAN (or a type of the VLAN) may indicate the type of the device. For example, the VLAN type (voice or data) may indicate whether the device is an IP telephone or a personal computer. In step 410, device blocking tool 120 may determine, based on the VLAN type, that the device is an IP telephone. Then in step 415, device blocking tool 120 may connect to the switch through which the device connected. Device blocking tool 120 may then determine whether to block a port through which the device connected or the VLAN in step 420. In particular embodiments, a user may indicate to device blocking tool 120 whether the port or the VLAN should be blocked.

If the VLAN should be blocked, device blocking tool 120 disassociates the VLAN in step 425. For example, device blocking tool 120 may take the VLAN offline, delete the VLAN, disconnect the device from the VLAN, and/or prevent further connections to the VLAN. In step 430, device blocking tool 120 moves the device to a blackholed VLAN. For example, device blocking tool 120 may reassign a connection of the device to a VLAN that is not operational and/or a VLAN that does not provide services to the device, but rather monitors the device.

In one embodiment, device blocking tool 120 retrieves an access control list for VLANs. In particular embodiments, the access control list for VLANs may be retrieved from an access control server. Device blocking tool 120 may then add the MAC address or the IP address to the access control list for VLANs. Then, device blocking tool 120 may communicate the updated access control list for. In particular embodiments, the updated access control list for VLANs is communicated back to the access control server. In certain embodiments, device blocking tool 120 adds the VLAN number to the access control list for VLANs to block the VLAN entirely regardless of which device connected through the VLAN.

If the port should be blocked, device blocking tool 120 may block the port in step 440. For example, device blocking tool 120 may refuse subsequent connections and/or services through that port. As another example, device blocking tool 120 may remove that port from service. In one embodiment, device blocking tool 120 retrieves an access control list for ports. The access control list for ports may be retrieved from an access control server. Device blocking tool 120 may then add the MAC address or the IP address to the access control list for ports. Then, device blocking tool 120 may communicate the updated access control list for ports. In particular embodiments, the updated access control list for ports may be communicated back to the access control server. In some embodiments, device blocking tool 120 may add a number identifying the port to the access control list for ports to block the port entirely regardless of which device connected through the port.

If device blocking tool 120 determines that the device connected through a wireless connection, device blocking tool 120 may proceed to the process described in FIG. 5. Device blocking tool 120 may determine a wireless LAN controller through which the device connected in step 505. In particular embodiments, device blocking tool 120 may make this determination using information in the response received in step 315. In step 515, device blocking tool 120 may connect to the wireless LAN controller. Device blocking tool 120 may then retrieve an access control list from the wireless LAN controller in step 525. In step 530, device blocking tool 120 may add the MAC address or the IP address to the access control list. Device blocking tool 12 may then communicate the updated access control list to the wireless LAN controller in step 535. In this manner, the wireless LAN controller may be informed of devices that it should not allow to connect to the network.

Modifications, additions, or omissions may be made to method 300 depicted in FIGS. 3 through 5. Method 300 may include more, fewer, or other steps. For example, steps may be performed in parallel or in any suitable order. While discussed as device blocking tool 120 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A wireless device blocking tool comprising:
   a user interface configured to receive at least one of a Media Access Control (MAC) address of a device and an Internet Protocol (IP) address of the device;
   a hardware processor configured to implement:
      a location engine configured to:
         communicate at least one of the MAC address and the IP address to an access control server;
         receive a response from the access control server in response to communicating at least one of the MAC address and the IP address;
         determine, based on the response, whether the device connected to directly a network through a wireless connection at a first hardware access point or a wired connection at a second hardware access point;
         in response to a determination that the device connected to the network through the wireless connection, determine a wireless local area network controller (WLC) through which the device connected to the network, the WLC separate from the first and second hardware access points, the WLC configured to:
            manage a plurality of access points, the plurality of access points comprising the first and second hardware access points; and
            connect to the first and second hardware access points to allow for devices to connect to the network through the first and second hardware access points; and
         in response to a determination that the device connected to the network through the wired connection, determine a switch through which the device connected to the network;
      a connection engine configured to:
         connect to the determined WLC in response to the determination that the device connected to the network through the wireless connection; and
         connect to the determined switch in response to the determination that the device connected to the network through the wired connection; and
      an update engine configured to:
         add at least one of the MAC address and the IP address of the device to a wired access control list from the access control server to prevent the device from connecting to the network through the wired connection if the device connected to the network through the wired connection; and
         add at least one of the MAC address and the IP address of the device to a wireless access control list from the access control server to prevent the device from connecting to the network through the wireless connection if the device connected to the network through the wireless connection.

2. The wireless device blocking tool of claim 1, further comprising a retrieval engine configured to retrieve, from the switch, a port through which the device connected to the network and a virtual local access network through which the device connected to the network.

3. The wireless device blocking tool of claim 2, wherein the update engine is configured to add at least one of the port and the MAC address of the device to an access control list to prevent the device from connecting to the network through the wired connection.

4. The wireless device blocking tool of claim 1, wherein the access control server stores a log comprising an entry, the entry indicating whether the device connected to the network through the wireless connection or the wired connection, the entry created when the device connected to the network.

5. The wireless device blocking tool of claim 1, further comprising a retrieval engine configured to retrieve, from the WLC, an identification of a wireless access point through which the device connected to the network, an access control list stored by the WLC, and an identification of a second device connected to the network through the WLC.

6. The wireless device blocking tool of claim 1, wherein:
the user interface is further configured to receive at least one of a hostname of the device and a username stored on the device; and
the location engine is further configured to communicate at least one of the hostname of the device and the username stored on the device to the access control server.

7. A method comprising:
receiving at least one of a Media Access Control (MAC) address of a device and an Internet Protocol (IP) address of the device;
communicating a query to an access control server, the query comprising at least one of the MAC address of the device and the IP address of the device;
receiving a response from the access control server in response to communicating the query;
determining, based on the response, whether the device connected directly to a network through a wireless connection at a first hardware access point or a wired connection at a second hardware access point;
in response to a determination that the device connected to the network through the wireless connection, determining a wireless local area network controller (WLC) through which the device connected to the network, the WLC separate from the first and second hardware access points, the WLC configured to:
manage a plurality of access points, the plurality of access points comprising the first and second hardware access points; and
connect to the first and second hardware access points to allow for devices to connect to the network through the first and second hardware access points;
in response to a determination that the device connected to the network through the wired connection, determining a switch through which the device connected to the network;
connecting to the determined WLC in response to the determination that the device connected to the network through the wireless connection;
connecting to the determined switch in response to the determination that the device connected to the network through the wired connection;
adding at least one of the MAC address and the IP address of the device to a wired access control list from the access control server to prevent the device from connecting to the network through the wired connection if the device connected to the network through the wired connection; and
adding at least one of the MAC address and the IP address of the device to a wireless access control list from the access control server to prevent the device from connecting to the network through the wireless connection if the device connected to the network through the wireless connection.

8. The method of claim 7, further comprising retrieving, from the switch, a port through which the device connected to the network and a virtual local access network through which the device connected to the network.

9. The method of claim 8, further comprising adding at least one of the port and the MAC address of the device to an access control list to prevent the device from connecting to the network through the wired connection.

10. The method of claim 7, wherein the access control server stores a log comprising an entry, the entry indicating whether the device connected to the network through the wireless connection or the wired connection, the entry created when the device connected to the network.

11. The method of claim 7, further comprising retrieving, from the WLC, an identification of a wireless access point through which the device connected to the network, an access control list stored by the WLC, and an identification of a second device connected to the network through the WLC.

12. The method of claim 7, further comprising:
receiving at least one of a hostname of the device and a username stored on the device; and
communicating at least one of the hostname of the device and the username stored on the device to the access control server.

13. A system comprising:
an access control server;
a wireless local area network controller (WLC);
a switch; and
a wireless device blocking tool configured to:
receive at least one of a Media Access Control (MAC) address of a device and an Internet Protocol (IP) address of the device;
communicate a query to the access control server, the query comprising at least one of the MAC address of the device and the IP address of the device;
receive a response from the access control server in response to communicating the query;
determine, based on the response, whether the device connected directly to a network through a wireless connection at a first hardware access point or a wired connection at a second hardware access point;
in response to a determination that the device connected to the network through the wireless connection, determine that the device connected to the network through the WLC, the WLC separate from the first and second hardware access points, the WLC configured to:
manage a plurality of access points, the plurality of access points comprising the first and second hardware access points; and
connect to the first and second hardware access points to allow for devices to connect to the network through the first and second hardware access points;
in response to a determination that the device connected to the network through the wired connection, determine that the device connected to the network through the switch;

connect to the WLC in response to the determination that the device connected to the network through the wireless connection;

connect to the switch in response to the determination that the device connected to the network through the wired connection;

add at least one of the MAC address and the IP address of the device to a wired access control list from the access control server to prevent the device from connecting to the network through the wired connection if the device connected to the network through the wired connection; and add at least one of the MAC address and the IP address of the device to a wireless access control list from the access control server to prevent the device from connecting to the network through the wireless connection if the device connected to the network through the wireless connection.

14. The system of claim 13, wherein the wireless device blocking tool is further configured to retrieve, from the switch, a port through which the device connected to the network and a virtual local access network through which the device connected to the network.

15. The system of claim 14, wherein the wireless device blocking tool is further configured to add at least one of the port and the MAC address of the device to an access control list to prevent the device from connecting to the network through the wired connection.

16. The system of claim 13, wherein the access control server stores a log comprising an entry, the entry indicating whether the device connected to the network through the wireless connection or the wired connection, the entry created when the device connected to the network.

17. The system of claim 13, wherein the wireless device blocking tool is further configured to retrieve, from the WLC, an identification of a wireless access point through which the device connected to the network, an access control list stored by the WLC, and an identification of a second device connected to the network through the WLC.

18. The system of claim 13, wherein the wireless device blocking tool is further configured to:

receive at least one of a hostname of the device and a username stored on the device; and communicate at least one of the hostname of the device and the username stored on the device to the access control server.

* * * * *